Figure 1:
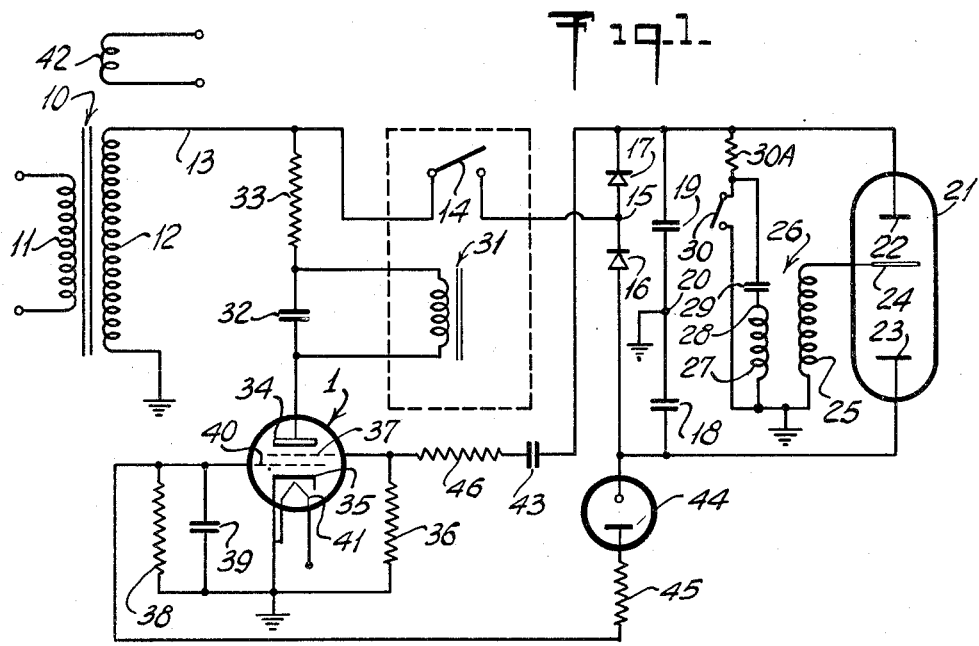

July 23, 1963   R. A. FLIEDER   3,098,947
ELECTRICAL SYSTEMS INCLUDING CAPACITORS
Filed May 2, 1960

INVENTOR
ROBERT A. FLIEDER
BY Edward V. Connors
ATTORNEY

United States Patent Office 3,098,947
Patented July 23, 1963

3,098,947
ELECTRICAL SYSTEMS INCLUDING CAPACITORS
Robert A. Flieder, East Brunswick, N.J., assignor to American Speedlight Corporation, Middle Village, Queens, N.Y.
Filed May 2, 1960, Ser. No. 26,024
14 Claims. (Cl. 315—188)

This invention relates to methods of operating and electrical systems including capacitors and in which the recharge current is cut off after the capacitor is discharged.

Such electrical systems may be used in various fields included among which are to provide a supply for electronic flash lamps used in the photographic and graphic arts.

In electronic flash lamp applications, capacitors are suddenly discharged through an electronic flash lamp, also called a gas discharge tube, to produce a brilliant flash of light of short duration. In color photography it is important that the amount of light per flash be the same each time in order for the film to be processed economically by automatic production methods. The flash equipment may be moved from one location to another in which the voltage of the power supply, while nominally the same, may vary sufficiently to adversely affect photographs taken on color film. Even at a fixed location there is usually sufficient variation in the voltage of the power supply to cause the same effect.

Furthermore, in such work it is important that the flash lamp equipment recycle in a short period of time so that pictures can be taken at a rapid rate such as every three seconds. It is possible to make the electronic flash power supply equipment of sufficient capacity to recharge almost instantaneously. However, such large capacity equipment not only is expensive, heavy, and bulky, but also requires a large capacity alternating current source which is not always available. Another difficulty is presented by the gas discharge tube in that upon its discharge, the current flow therethrough ionizes the gas therein and the current continues to flow or "holdover" unless means are provided to disconnect the power supply, or to reduce the current at least below a minimum amount required to maintain the ionization of the gas.

The time of deionization of the gas discharge tube depends upon its loading but under average conditions the gas discharge tube will deionize in about two cycles if its current is reduced below the minimum value required to maintain ionization. Another difficulty is presented by the usual power supply for the capacitors in that the charging rate drops off as the capacitors become charged. For these reasons it is important that the electrical system for the gas discharge tube include means for quickly bringing the capacitors up to the desired amount of charge and then preventing overcharge. In addition the electrical system must disconnect the power supply from the gas discharge tube from at least two cycles to about one second after each flash. The electrical system must be adequate to provide a full supply on the capacitors.

The present invention aims to overcome the foregoing difficulties and disadvantages by providing a method of operating and an electrical system in which overcharge of the capacitors is prevented and in which the recharge current is cut off after the capacitor is discharged.

Another object of the invention is to provide a method of operating and an electrical system which is simple and economical in manufacture, efficient in operation and durable in use.

In accordance with the invention this is accomplished by providing an electronic switch for controlling the disconnecting of the charging current at the desired charge on the capacitors and utilizing the discharge of the main capacitor to drop the potential on a control capacitor to control the disconnecting of the power supply for a predetermined time interval of about a few cycles upon the flashing discharge tube so that it becomes deionized.

The invention is advantageous in that variations in the predetermined charge cutoff or in the holdover time may be made by substituting readily available components.

Other objects and advantages of the invention will be apparent from the following description and from the accompanying drawings which show, by way of example, embodiments of the invention.

In the drawing:
FIGURE 1 is a schematic circuit diagram of an electrical system in accordance with invention embodying a thyratron as the electronic switch for the control of electrical disconnecting means.

Figure 2:
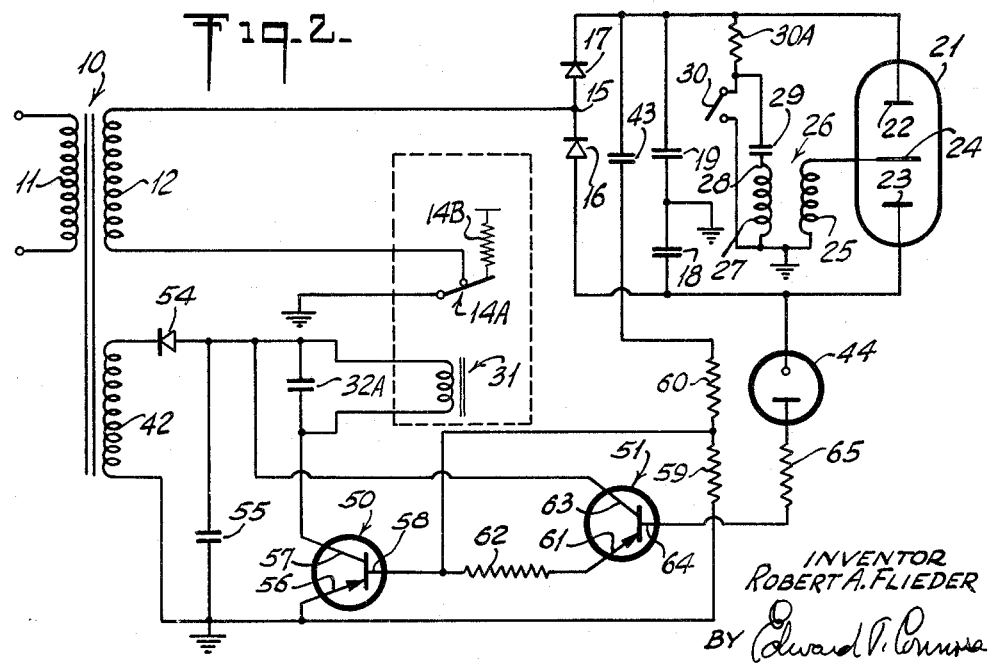

FIGURE 2 is a schematic circuit diagram of an electrical system in accordance with the invention embodying a transistor and a transistor amplifier as the electronic switch for the control of electrical disconnecting means.

Referring to FIGURE 1 there is shown a circuit embodying a thyratron 1 as the control electronic switch. The circuit includes a transformer 10 having a low voltage winding 11 and an overvoltage winding 12 which is grounded at one end, its other end 13 being connected through a relay switch 14 to midpoint 15 of a pair of rectifiers 16 and 17 supplying a main capacitor bank formed of capacitors 18 and 19 with a grounded midpoint 20. The rectifiers 16 and 17 are connected in a voltage doubling and the outer terminal of the capacitor 19 is positive while the outer terminal of capacitor 18 is negative. The output of the capacitors 18 and 19 may be connected to a desired load such as a gas discharge tube 21 having an anode 22 and a cathode 23. Triggering of the gas discharge tube 21 may be accomplished by a pulse supplied by a triggering electrode 24 connected to one end of a high voltage winding 25 of a triggering transformer 26. The other end of the high voltage winding 25 and one end of a low voltage winding 27 are grounded. The other end of the low voltage winding 27 is connected through a triggering capacitor 29 and through a resistance 28 to the capacitor 19. A switch 30 is connected across the series connected low voltage winding 27 and the capacitor 29.

The relay switch 14 is of the type normally held in the open position by conventional means such as a spring or by gravity. A relay coil 31 for the operation of the relay switch 14 has a capacitor 32 connected across its terminals to prevent relay chatter. One of the relay terminals is connected through a resistance 33 to the high voltage winding 12 of the transformer 10. The other terminal of the relay coil 31 is connected to anode 34 of the thyratron 1. Cathode 35 of the thyratron 1 is grounded and connected through a resistance 36 to its grid 37. The cathode 35 is also connected through a resistor 38 connected in parallel with a capacitor 39 to its other grid 40. Heater 41 may be connected to a filament winding 42 of the transformer 10.

A connection for holdover control of the main capacitor is made by a lead from the positive terminal of the capacitor 19 through a RC circuit of a capacitor 43 in series with a resistance 46 connected to the grid 37.

A connection for overvoltage control is made by a lead from the negative terminal of the capacitor 18 through a corona discharge tube 44 in series with a current limiting resistance 45 to the grid 40.

In the operation of the electrical system the primary 11 of the transformer 10 is connected to a source of alternating current. Upon the application of the alternating current potential to the transformer 10 the heater 41 of the thyratron 1 is energized and the thyratron soon passes current between its cathode 35 and its anode 34 through the relay coil 31 to close the normally open relay switch 14. The source voltage is stepped up by the overvoltage winding 12 and converted to direct current by the rectifiers 16 and 17 to charge the capacitors 18 and 19.

As the capacitors 18 and 19 become charged, FIGURE 1, their voltage increases to a predetermined value whereupon the corona discharge tube 44 breaks down passing current through the resistance 45 and producing a negative potential on the grid 40 of the thyratron 1 which causes it to cease conducting current. The relay switch 14 then opens stopping further charging of the capacitors 18 and 19. Upon the dropping of the potential of the capacitor 18, by leakage or by the discharge thereof, the corona discharge tube 44 ceases to conduct and the grid 40 loses its negative potential thereby allowing the thyratron 1 to again conduct current and the relay switch 14 is closed resulting in the charging of the capacitors 18 and 19.

As the main capacitor bank is being charged, FIGURE 1, the capacitor 43 likewise is charged through the current limiting resistance 44. Upon the discharge of the main capacitors 18 and 19 their potential is decreased because of the very low resistance of the load resulting in the discharge of the capacitor 43 through the resistances 46 and 36. The value of the resistance 46 is selected to give a rate of discharge of the capacitor 43 so that the grid 34 is maintained at a negative potential for the desired period of time to allow the gas discharge tube 21 to become de-ionized. During the time that the grid 37 is negative the thyratron 1 is prevented from conducting current and the relay switch 14 is opened ceasing current flow to the capacitors 18 and 19 and to the gas discharge tube 21.

The resistance 38 acts to bleed the capacitor 39 and to normally hold the grid 40 at cathode potential. The grid 37 is normally held at cathode potential by the resistance 36. The capacitor 39 becomes charged during the period the corona discharge tube 44 is conducting and slowly discharges through the resistance 38 thereby providing a slight time lag and stabilizing effect.

In the event the load on the capacitors 18 and 19 is the gas discharge tube 21, it may be discharged by closing the switch 30 which results in the passing of a current pulse through the primary 27 of triggering transformer 26 which is stepped up by the high voltage winding 25 and passed to the triggering electrode 24 which initiates the flash of the gas discharge tube 21 as is well known in the art.

Referring to FIGURE 2 a somewhat similar circuit is shown excepting that the thyratron 1 is replaced by a transistor 50 and a transistor amplifier 51. In using this circuit it is necessary to provide isolation between the overvoltage and the holdover circuits, that is, the circuit including the corona discharge tube 44 should be isolated from the overvoltage circuit including the capacitor 43 and the resistor 60. In the circuit of FIGURE 1 this is accomplished by using separate grids on the thyratron. In the circuit of FIGURE 2 this is accomplished by using two transistors and a further advantage is had in that the current flow in the overvoltage circuit is amplified and thus the current through the corona discharge tube 44 need not be so large.

In FIGURE 2 the same numerals are used for the same parts where practical as in FIGURE 1. A source of low voltage direct current for the transistors 50 and 51 is provided from the low voltage winding 42 on the transformer 10 by a rectifier 54 having its output filtered by a capacitor 55.

The transistor 50 is connected in a common emitter circuit and has its emitter 56 connected to the positive side of the direct current supply, its collector 57 connected in series with the relay coil 31 to the negative side of the supply, and its base 58 connected to the midpoint of a connection between resistors 59 and 60. Resistance 59 is connected to the emitter 56, and resistance 60 is connected in series with the capacitor 43 to the positive terminal of capacitor 19.

The transistor 51 has its emitter 61 connected in series with a resistance 62 to the base 58 of the transistor 50. Collector 63 of the transistor 51 is connected to the negative side of the direct current power supply. Base 64 of the transistor 51 is connected through resistor 65 in series with the corona discharge tube 44 to the negative terminal of the capacitor 18.

As the capacitors 18 and 19 become charged, FIGURE 2, their voltage increases to a predetermined value whereupon the corona discharge tube 44 breaks down passing current through resistance 65 to the base 64 of the transistor 51. There is a current gain through the transistor 51 from its base 64 to its emitter 61 and thus an amplifying effect. The amplified current from the emitter 61 passes through the current limiting resistor 62 to the base 58 of transistor 50. Here there is also a current gain as the current passes through the base 58 to the emitter 56 causing a still further amplified current to flow through the collector 57 and the relay coil 31. The relay switch 14A is of the type in which its contacts are normally held closed as by a spring 14B. By the opening of the relay switch 14A, further charging of the capacitors 18 and 19 is prevented until their potential is dropped below the amount required to continue firing the corona discharge tube 44. Upon the dropping of the potential of the capacitor 18, by leakage or by the discharge thereof, the corona discharge tube 44 ceases to conduct, the transistors 50 and 51 cease conducting, and the relay switch is allowed to close resulting in the charging of the capacitors 18 and 19.

As the main capacitor bank is being charged, FIGURE 2, the capacitor 43 is also charged through the current limiting resistances 59 and 60. Upon the discharge of the main capacitors 18 and 19 their potential is decreased because of the very low resistance of the load resulting in the discharge of the capacitor 43 through the resistances 59 and 60 and through the base 58 of the transistor 50 causing current gain through the collector 57 and the relay coil 31 resulting in the opening of the relay switch 14A. The resistance 60 limits the discharge rate of the capacitor 43 so that a current flow is present from two cycles to one second. Within limits the holdover, or holding open period of the relay switch 14A may be set for other times by varying the RC constants of the circuit which includes the capacitor 43 and the resistance 60.

It should be understood that while the invention has been illustrated using junction transistors of the P-N-P type, other types of transistors could be readily used. Also transistors of an opposite conductivity type to those illustrated might be used in which event the polarities would necessarily be arranged accordingly.

It is to be understood that the circuit specifications may vary for particular applications and the following circuit specifications are included by way of example only.

| | |
|---|---|
| Thyratron 1 | 2D21 |
| Corona discharge tube 44 | GV3B |
| Transistor 50 | 2N177 |
| Transistor 51 | 2N591 |
| Transformer 10 | 110/475 |
| Capacitor 32 mfd | 5.0 |
| Capacitor 32A mfd | 50 |
| Capacitor 39 mfd | 0.1 |
| Capacitor 43 mfd | 0.25 |
| Capacitor 55 mfd | 500 |
| Resistance 33 | 10K |
| Resistance 36 | 100K |
| Resistance 38 meg | 1 |
| Resistance 45 | 680K |
| Resistance 59 | 1K |

Resistance 60 _____ 27K
Resistance 62 _____ 300

While the invention has been described and illustrated with reference to specific embodiments thereof, it will be understood that other embodiments may be resorted to without departing from the invention. Therefore, the form of the invention set out above should be considered as illustrative and not as limiting the scope of the following claims.

I claim:

1. An electrical system comprising a source of electricity, a main capacitor, means for charging the main capacitor from the source, a load, means to discharge the main capacitor into the load, a control capacitor, means responsive to the discharge of the control capacitor for disconnecting the main capacitor from the source, and means to impress a voltage responsive to the voltage across the main capacitor on the control capacitor, whereby upon the discharge of the main capacitor into the load the voltage of the main capacitor is reduced and the voltage is reduced across the control capacitor resulting in a pulse discharge thereof so that the main capacitor is disconnected from the source of electricity.

2. An electrical system comprising a source of electricity, a main capacitor, means for charging the main capacitor from the source, a load, means to discharge the main capacitor into the load, a control capacitor, means responsive to the discharge of the control capacitor for disconnecting the main capacitor from the source, and means to impress at least a portion of the voltage of the main capacitor on the control capacitor, whereby upon the sudden discharge of the main capacitor the voltage is reduced across the control capacitor thereby producing a pulse discharge thereof for actuating the means responsive to the discharge of the control for disconnecting the main capacitor from the source.

3. An electrical system comprising a source of electricity, a main capacitor, means for charging the main capacitor from the source, a load, means to discharge the main capacitor into the load, a control capacitor, means responsive to the discharge of the control capacitor for disconnecting the main capacitor from the source, and means to impress at least a portion of the voltage of the main capacitor on the control capacitor, whereby upon the discharge of the main capacitor the voltage is reduced across the control capacitor resulting in its discharge so that the main capacitor is disconnected from the source of electricity.

4. An electrical system comprising a source of electricity, a main capacitor, means for charging the main capacitor from the source, a load, means to discharge the main capacitor into the load, a control capacitor, means responsive to the discharge of the control capacitor for disconnecting the main capacitor from the source, and means to impress a voltage responsive to the voltage across the main capacitor on the control capacitor, whereby upon the discharge of the main capacitor the voltage is reduced across the control capacitor resulting in its discharge so that the main capacitor is disconnected from the source of electricity.

5. An electrical system comprising a source of electricity a main capacitor, means for charging the main capacitor from the source, a load, means to discharge the main capacitor into the load, a control capacitor, means effective when the voltage across the main capacitor is suddenly reduced a predetermined amount for disconnecting the main capacitor from the source, and means to impress at least a portion of the voltage of the main capacitor on the control capacitor, whereby upon the discharge of the main capacitor the voltage is reduced across the control capacitor resulting in its discharge so that the main capacitor is disconnected from the source of electricity.

6. An electrical system comprising a source of electricity, a main capacitor, means for charging the main capacitor from the source, a load, means to discharge the main capacitor into the load, a control capacitor, means effective when the voltage across the main capacitor is reduced a predetermined amount for disconnecting the main capacitor from the source, means to impress at least a portion of the voltage of the main capacitor on the control capacitor, whereby upon the discharge of the main capacitor the voltage is reduced across the control capacitor resulting in its discharge so that the main capacitor is disconnected from the source of electricity.

7. An electrical system comprising a source of electricity, a main capacitor, means for charging the main capacitor from the source, a load, means to discharge the main capacitor into the load, a control capacitor, a normally closed coil operated switch for disconnecting the main capacitor from the source, a resistance in series with the control capacitor, the control capacitor, the switch coil, and the series resistance connected across the main capacitor so that at least a portion of the voltage across the main capacitor is applied to the control capacitor, whereby upon the discharge of the main capacitor the voltage across the control capacitor is reduced resulting in its discharge through the switch coil to open the switch thereby disconnecting the main capacitor from the source of electricity.

8. An electrical system comprising a source of electricity, a main capacitor, means for charging the main capacitor from the source, a load, means to discharge the main capacitor into the load, a control capacitor, a normally closed spring operated switch including an opening coil for disconnecting the main capacitor from the source, a resistance in series with the control capacitor, the control capacitor, the switch coil, and the series resistance connected across the main capacitor so that at least a portion of the voltage across the main capacitor is applied to the control capacitor, whereby upon the discharge of the main capacitor the voltage across the control capacitor is reduced resulting in its discharge through the switch coil opening the switch against the action of the spring thereby disconnecting the main capacitor from the source of electricity.

9. A power supply for an electronic flash lamp comprising a source of electricity, a main capacitor, an electronic flash lamp, means for charging the main capacitor from the source, means to discharge the main capacitor into the electronic flash lamp, a control capacitor, means responsive to the discharge of the control capacitor for disconnecting the main capacitor from the source, means to impress a voltage responsive to the voltage across the main capacitor on the control capacitor, whereby upon the discharge of the main capacitor through the electronic flash lamp the voltage is reduced across the control capacitor resulting in its discharge so that the main capacitor is disconnected from the source of electricity.

10. An electrical system comprising a source of electricity, a main capacitor, means for charging the main capacitor from the source, a load, means to discharge the main capacitor into the load, a control capacitor, means to impress a voltage responsive to the voltage of the main capacitor on the control capacitor, an electronic switch, a relay controlled by the electronic switch for disconnecting the main capacitor from the source, the electronic switch responsive to the discharge of the control capacitor, means responsive to a predetermined voltage on the main capacitor for actuating said electronic switch, whereby the electronic switch prevents overcharge of the main capacitor and upon the rapid discharge of the main capacitor it is disconnected from its source.

11. An electrical system comprising a source of electricity, a main capacitor, means for charging the main capacitor from the source, a load, means to discharge the main capacitor into the load, a control capacitor, means to impress a voltage responsive to the voltage of the main capacitor on the control capacitor, a double grid thyratron, a relay controlled by the thyratron for disconnecting the main capacitor from the source, the control capacitor connected to one of the thyratron grids so that upon the discharge of the main capacitor the control capacitor discharge produces a potential on the said grid rendering the thyratron non-conductive thereby causing the main capacitor to be disconnected from the source, and means responsive to a predetermined voltage on the main capacitor for producing a pulse on the second grid rendering the thyratron non-conductive, thereby causing the main capacitor to be disconnected from the source.

12. An electrical system comprising a source of electricity, a main capacitor, means for charging the main capacitor from the source, a load, means to discharge the main capacitor into the load, a control capacitor, a resistance in series with the control capacitor means to impress a voltage responsive to the voltage of the main capacitor on the control capacitor, a double grid thyratron, a relay controlled by the thyratron for disconnecting the main capacitor from the source, the control capacitor connected to one of the thyratron grids so that upon the discharge of the main capacitor the control capacitor discharge through the resistor produces a potential for a predetermined time interval on the said grid rendering the thyratron non-conductive thereby causing the main capacitor to be disconnected from the source for a desired period of time, and means responsive to a predetermined voltage on the main capacitor for producing a pulse on the second grid rendering the thyratron non-conductive thereby causing the main capacitor to be disconnected from the source.

13. An electrical system comprising a source of electricity, a main capacitor, means for charging the main capacitor from the source, a load, means to discharge the main capacitor into the load, a control capacitor, a resistance in series with the control capacitor means to impress a voltage responsive to the voltage of the main capacitor on the control capacitor, a double grid thyratron including a cathode, a relay controlled by the thyratron for disconnecting the main capacitor from the source, the control capacitor connected to one of the thyratron grids so that upon the discharge of the main capacitor the control capacitor discharge through the resistor produces a potential force predetermined time interval on the said grid rendering the thyratron non-conductive thereby causing the main capacitor to be disconnected from the source for a desired period of time, a corona discharge tube responsive to a predetermined voltage on the main capacitor for producing a pulse on the second grid rendering the thyratron non-conductive thereby causing the main capacitor to be disconnected from the source and a suppression capacitor by-passed with a bleed resistor connected between said second grid and the cathode to stabilize the discharge through the corona discharge tube.

14. An electrical system comprising a source of electricity, a main capacitor, means for charging the main capacitor from the source, a load, means to discharge the main capacitor into the load, a control capacitor, means to impress a voltage responsive to the voltage of the main capacitor on the control capacitor, a pair of transistors each having a base electrode, an emitter electrode and a collector electrode, a relay controlled by one of the transistors for disconnecting the main capacitor from the source, the one transistor having its base connected to the control capacitor so that upon the discharge of the main capacitor the control capacitor discharge produces a current through the one transistor base controlling the collector current to open the relay thereby causing the main capacitor to be disconnected from the source, the second transistor connected to the one transistor in amplifying relationship, and means responsive to a predetermined voltage on the main capacitor for producing a current through the second transistor base to open the relay thereby causing the main capacitor to be disconnected from the source.

References Cited in the file of this patent

UNITED STATES PATENTS

| | | |
|---|---|---|
| 2,935,650 | Rock | May 3, 1960 |
| 2,944,191 | Kapteyn | July 5, 1960 |
| 2,946,924 | Gerlach et al. | July 26, 1960 |